United States Patent [19]

Toth et al.

[11] Patent Number: 5,554,992
[45] Date of Patent: Sep. 10, 1996

[54] RADAR SCAN CONVERTER FOR PRODUCING AN AGGREGATE RADIAL SCAN PATTERN THAT IS A FUNCTION OF HYPERBOLICALLY-BASED RESOLUTION BOUNDARIES

[75] Inventors: Joe M. Toth; Kenneth E. Nuedorf, both of Winnipeg, Canada

[73] Assignee: Lockheed Martin Corporation, Bethesda, Md.

[21] Appl. No.: 462,526

[22] Filed: Jun. 5, 1995

[51] Int. Cl.⁶ .............................. G01S 7/293; G01S 7/04
[52] U.S. Cl. .................................................. 342/185
[58] Field of Search ..................... 342/185, 176; 364/731

[56]  References Cited

U.S. PATENT DOCUMENTS

| | | | |
|---|---|---|---|
| 4,697,185 | 9/1987 | Thomas et al. | 342/185 |
| 4,745,475 | 5/1988 | Bicknell | 342/185 |
| 4,931,801 | 6/1990 | Hancock | 342/185 |
| 5,126,747 | 6/1992 | Ren et al. | 342/185 |
| 5,414,429 | 5/1995 | Giraudy | 342/185 |

*Primary Examiner*—Ian J. Lobo
*Attorney, Agent, or Firm*—Glenn W. Bowen

[57] ABSTRACT

A radar scan conversion from radar data in polar coordinates to radar data in rectangular coordinates is employed to supply (x,y) coordinate data to a display, which has variable azimuthal pixel resolution that increases from the center of the display to its periphery. An aggregate radial scan pattern is generated on the display that consists of a plurality of radials each of which have active lengths that span one or more of a plurality of selected boundary resolution zones of the display. These zones are defined by a series of different hyperbolically-based resolution boundaries which define resolution zones of increasing azimuthal resolution values as the zones extend further from the center of said display towards the periphery of said display. The number of radials that are generated on said display match the average azimuthal resolution of said display for each zone. A process wherein such aggregate radial scan pattern is formed such that the number of radials in each zone from the outermost zone to the center of said display is such that each zone is related to twice as many radials as is its next innermost neighboring zone.

4 Claims, 7 Drawing Sheets

| ROM Address | Δx | Δy | R | 4K | 8K | 16K | 32K |
|---|---|---|---|---|---|---|---|
| 0(ACP0) | - | - | - | x | x | x | x |
| 1 | - | - | - | | | | x |
| 2 | - | - | - | | | x | x |
| 3 | - | - | - | | | | x |
| 4 | - | - | - | | x | x | x |
| 5 | - | - | - | | | | |
| 6 | - | - | - | | | x | x |
| 7 | - | - | - | | | | x |
| 8(ACP1) | - | - | - | x | x | x | x |
| 9 | - | - | - | | | | x |
| 10 | - | - | - | | | x | x |
| 11 | - | - | - | | | | x |
| 12 | - | - | - | | x | x | x |
| 13 | - | - | - | | | | x |
| 14 | - | - | - | | | x | x |
| 15 | - | - | - | | | | x |
| 16 | - | - | - | x | x | x | x |
| 0 | 0 | 0 | 0 | | | | |
| 0 | 0 | 0 | 0 | | | | |
| 0 | 0 | 0 | 0 | | | | |
| m-8 | - | - | - | x | x | x | x |
| m-7 | - | - | - | | | | x |
| m-6 | - | - | - | | | x | x |
| m-5 | - | - | - | | | | x |
| m-4 | - | - | - | | x | x | x |
| m-3 | - | - | - | | | | x |
| m-2 | - | - | - | | | x | x |
| m-1 | - | - | - | | | | x |

FIG. 5

RADAR SCAN CONVERTER FOR PRODUCING AN AGGREGATE RADIAL SCAN PATTERN THAT IS A FUNCTION OF HYPERBOLICALLY-BASED RESOLUTION BOUNDARIES

BACKGROUND OF THE INVENTION

Field of the Invention

This invention relates to the high-speed conversion of polar coordinate radar data into Cartesian coordinate display data. In particular, it relates to a technique for minimizing the spoking, or gaps, that occur in radar display images due to differences in the resolutions of the radar and the display at different areas of the display. The invention is accomplished through the production of an aggregate radial scan pattern that is adapted to vary in accordance with the resolution of the display as a function of a plurality of hyperbolically-based resolution boundaries.

DESCRIPTION OF THE BACKGROUND ART

Conventional radar displays consist of circular-shaped cathode ray tubes (CRT) in which: a rotating beam is made visible by electron bombardment of a phosphor coating on a CRT screen. Targets can be identified on the screen as the beam rotates in synchronism with a rotating antenna or a rotating scan pattern. This type of display is known as a Plan Position Indicator (PPI).

A PPI display has a number of objectionable characteristics. Because of the fact that it relies on the persistence of a phosphor, there is an inherent lack of brightness. Thus, the early tubes could be viewed satisfactorily only under very low levels of ambient lighting and refreshing of the PPI display occurred only once per revolution of the radar antenna.

In order to overcome these deficiencies, and to achieve other advantages, scan converters have been developed to convert PPI information which is a function of the radius (R) and the angle ($\theta$) of the radial beam relative to a reference location to Cartesian (x) and (y) coordinates which are employed by TV and computer screen monitors. Scan converter systems also allow for the integration of radar displays with computer video recording techniques, including multiple color displays, overlapping windows and the capability of adding text to the display. Various types of systems have been developed for providing the conversion of the ($r,\theta$) information into the (x,y) information. Many of these relied on hardware systems which are desirable when high-speed conversion is needed to process the real-time information that is received from the radar return.

Algorithms for radar coordinate digital scan conversion have also been developed, as shown in U.S. Pat. No. 4,697,185 entitled "Algorithm for Radar Coordinate Conversion and Digital Scan Converters," issued Sep. 29, 1987 to David M. Thomas et al., and U.S. Pat. No. 4,931,801 entitled "Method and Apparatus to Scan Convert Radar Video to Television Outputs," issued Jun. 5, 1990 to William R. Hancock.

In the Thomas et al. '185 patent it was noted that near the center or origin of a PPI display, the azimuthal resolution of the radar is greater than the resolution of the display, and, therefore, a number of ($r,\theta$) points are matched to the same (x,y) point. At long ranges in a PPI display, however, the radar resolution will often be less than that of the display. This results in the occurrence of a number of open areas, or gaps, in the outer areas of the display which have to be filled in. At intermediate ranges, the resolution of the radar and the display are approximately equal, and at some point there is a one-to-one mapping between the two coordinate systems. The Thomas et al. patent notes the use of peak detecting techniques as being desirable to correct the differences in the radar azimuthal resolution and the resolution of the display. In the Thomas et al. '185 patent, look-up tables are utilized to hold sine and cosine values which are used to update the x and y values to the next consecutive coordinate point by adding a sine value to the x coordinate axis and a cosine value to the y coordinate axis. In the Hancock patent look-up tables were employed to control intensities of the display pixels. Look-up tables have also been employed in other graphic displays to control the colors of a displayed image.

A copending United States patent application entitled "Programmed Radar Coordinate Scan Conversion" was filed on Nov. 1, 1993 by the inventors of this invention and assigned to the assignee of this invention. The invention of this prior application is directed to software programmed radar scan conversion. In the invention of this prior application, radar scan conversion from ($r,\theta$)) values employed in a PPI display are converted to (x,y) coordinates of a computer monitor by utilizing a digital computer which employs look-up tables. The look-up tables are utilized in an algorithm which first computes an inverse mapping of the (x,y) coordinates of the monitor to the ($r,\theta$) coordinates of the PPI display to fill the look-up table with values that link together the (x,y) points to the corresponding ($r,\theta$) points.

During this mapping some of the ($r,\theta$) points in the system of the copending applications will not have been "hit" or converted. To complete the mapping process a second phase "forward mapping" is then performed which links the remaining ($r,\theta$) coordinates which have not been mapped during the inverse mapping phase to (x,y) coordinates. Each table entry represents an image patch. The number of pixels in a patch varies according to the radial distance of the patch from the origin of the display to compensate for the differences between the resolution of the radar and the resolution of the display. Since the look-up table has been established, the algorithm relates the predefined patches to the coordinate points of the display.

The Thomas et al. '185 patent has a FIG. 4, which is labeled "Prior Art", that shows an aggregate radial scan pattern which is formed of multiple radial lines. This scan pattern prevents spoking by filling of pixel "holes" which contribute to undesired image gaps. This aggregate radial scan pattern, like that of the prior copending application Ser. No. 08/318,952, entitled "Radar Scan Converter Using Multiple Azimuth Processing," filed Oct. 6, 1994 in the names of Stephen M. Sohn and Douglas A. Peterson and assigned to the assignee of the present invention, is based upon concentric, circular resolution boundaries to provide for an improved display in a Cartesian coordinate display system. The extension of this technique to an offset display is disclosed in the copending patent application Ser. No. 08/371,257, entitled "Radar Scan Converter for PPI Rectangular and PPI Offset Rectangular Modes," filed Jan. 11, 1995 in the names of Stephen M. Sohn and Douglas A. Peterson and assigned to the assignee of the present invention.

Although an aggregate radial scan pattern, based upon concentric circular resolution boundaries, provides appreciable reduction in the amount of spoking that occurs on a Cartesian coordinate display, deficiencies remain with such a technique when the angle of the primary radial line with respect to the x and y coordinate axes is displaced appreciably from the angles 45°, 35°, 225° and 315° and is particularly noticeable along the horizontal x and the vertical y axes of the display.

BACKGROUND OF THE INVENTION

Spoking, or image gaps, on an (x,y) Cartesian coordinate display screen which utilizes radar data that has been converted from radial and angular data (r,θ) may be eliminated by employing an aggregate radial scan pattern that is based on concentric, circular resolution boundaries as illustrated by reference to FIG. 1. The upper right-hand quadrant I of the graph illustrated in FIG. 1 shows an array of display pixels which are aligned with respect to grid lines that run parallel to the horizontal x and the vertical y axis. The pixels which are in the sector that is included by the radial r1 and r2 in quadrant I are of interest. The pixel representation of FIG. 1 is not meant to be quantitatively correct since the pixels in a display will actually be much closer together, thereby giving a much higher density of pixels than can be shown in the drawing. Thus, FIG. 1 is intended only for illustrative purposes to give a qualitative understanding of the technique of the invention.

In quadrant I it is readily apparent that as the origin is approached, the azimuthal resolution of the radar will be greater than that of the display. For example, in the segment included between the radial r1 and r2 and the arc $a_1$, there are very few pixels, whereas the segment between the radials r1 and r2 and the arcs $a_2$, $a_3$ include many pixels.

The radial r1 is part of the aggregate scan pattern consisting of the radials r1, r3–r5. The radial r2 is the next position of the full radial line r1 as the scan pattern sweeps in a clockwise direction, and the aggregate scan pattern begins to be formed relative to the radial r2. As the radial lines moves further from the origin toward the arcs $a_4$ and $a_5$, there is a corresponding increase in the number of display pixels that are included in the sectors between the radial lines r1 and r2. Somewhere between the innermost arc $a_1$ and an outer arc, such as arc $a_5$, there is a zone in which the radar resolution and the display resolution are approximately equal so that there will be a one-to-one mapping of data samples from the two coordinate systems in this zone. Moving further from the origin toward the arc $a_5$, there is a point at which some of the (r,θ) incoming data will not map to any (x,y) display pixels, and thus there will be undesirable holes or "spoking" in this display area, which if not corrected will deteriorate the quality of this portion of the display.

A technique known as an aggregate radial scan pattern, which is based on concentric, circular resolution boundaries, is illustrated in FIG. 4 of the Thomas, et al. '185 patent and software methods for providing such a scan pattern described in the prior copending applications Ser. No. 08/318,952 and Ser. No. 08/371,257. In these documents the segments defined by the radials, such as r1 and r2, and arcs, such as $a_1$–$a_5$, approximate the change in the resolution of the pixels of the display. Thus, for example, in the innerzone between the origin, 0, and the arc $a_1$ that is included between the radial lines r1 and r2, there may be an average number of approximately 4,000 pixels, or 4K pixels, as the radial scan progresses from r1 to r2 in a clockwise manner. The display may thus be said to have a resolution of 4K in the portion of the display. The next outward segment defined between the arcs $a_1$ and $a_2$ then may be said to have a resolution of 8K. The number of pixels in this portion of the display screen will be approximately double those in the 4K region due to the increase in area of the 8K regions. Correspondingly, the segments between the arcs $a_2$ and $a_3$ may be said to have a 16K resolution, and the segment between the arcs $a_3$ and $a_4$ may be said to have a 32K resolution and so forth as the edge of the display is approached.

The aggregate radial scan pattern shown in quadrant I of FIG. 1 is drawn dependent on the resolution zones defined by arcs $a_1$–$a_5$ and the radial lines r1 and r2. The number of radials that are generated on the screen double in the same manner as the resolution of the corresponding display area. Thus, it is seen in quadrant I that the zone 1 in the segment nearest the origin is related only to the radials r1 and r2. The next set of zones 2 and 3 are related to an additional radial r3. The zones 4, 5, 6 and 7 are correspondingly related to r4 and r5 as well as r1, r2, r3. In this manner, the number of radials that are generated within a zone increase so as to match the increase in resolution of the display. Each additional generated radial line, such as the line r3, bisects the area between two adjacent radials, for example, radials r1 and r2, and extends between an arc segment that represents a new higher resolution boundary, such as the arc segment $a_1$ to the outer edge of the display area.

It is seen from the graph of quadrant I that approximately the same number of pixels will be incorporated in the zones that are defined by the new radials so that every zone between any two adjacent radials of the aggregate scan pattern will contain approximately the same number of pixels as every other zone of quadrant I. Therefore, proceeding from the origin outwardly, the number of radials that are added to the radial lines r1 and r2 as the number of zones increase form a pattern of 0, 1, 2, 4, 8, etc. The radial lines shown in FIG. 1 extend only out to the arc $a_4$ and the additional aggregate radials needed to provide a pattern for the zone between the arcs $a_4$ and $a_5$ are not shown for ease of illustration. The entire aggregate scan pattern at a given time that exists in quadrant 1 consists of r1 and all of the other radials shown in quadrant 1, (except r2), and moves as a coordinated radial sweep pattern in a clockwise direction.

The aggregate radar scan pattern technique which relies on circular resolution boundaries that is shown in the quadrant I of the graph of FIG. 1 works relatively well to eliminate spoking when radial lines make angles close to 45° with respect to the horizontal and vertical axis, for example, at approximately 45°, 135°, 225° and 315° with respect to the positive x axis. However, as radial lines approach either axis, this technique fails to provide a smooth and accurate display of the radar data in a satisfactory manner for high resolution displays. A qualitative analysis of the reason for this deficiency is described by reference to quadrants II and III of FIG. 1 where again the illustrated pixels are intended to provide only a qualitative understanding, and not a quantitatively accurate one.

SUMMARY OF THE INVENTION

The present invention provides for the minimization of spoking or holes in the returned image in a radar coordinate conversion system in which (r,θ) data are converted to (x,y) Cartesian coordinate data. The spoking is minimized by use of the aggregate radial scan pattern technique wherein the resolution boundaries of the display are a function of hyperbolically-based resolution boundaries, and the resulting information is stored in a look-up table which controls the generation of the aggregate radial scan pattern. The invention is implemented such that both a centered and an offset scan mode are obtainable.

BRIEF DESCRIPTION OF THE DRAWINGS

The invention is described by reference to the drawings in which:

FIG. 5 is a table that shows the ROM storage pattern that generates the hyperbolically-based resolution boundaries and the aggregate radial scan pattern;

DESCRIPTION OF THE PREFERRED EMBODIMENT

Figure 1:
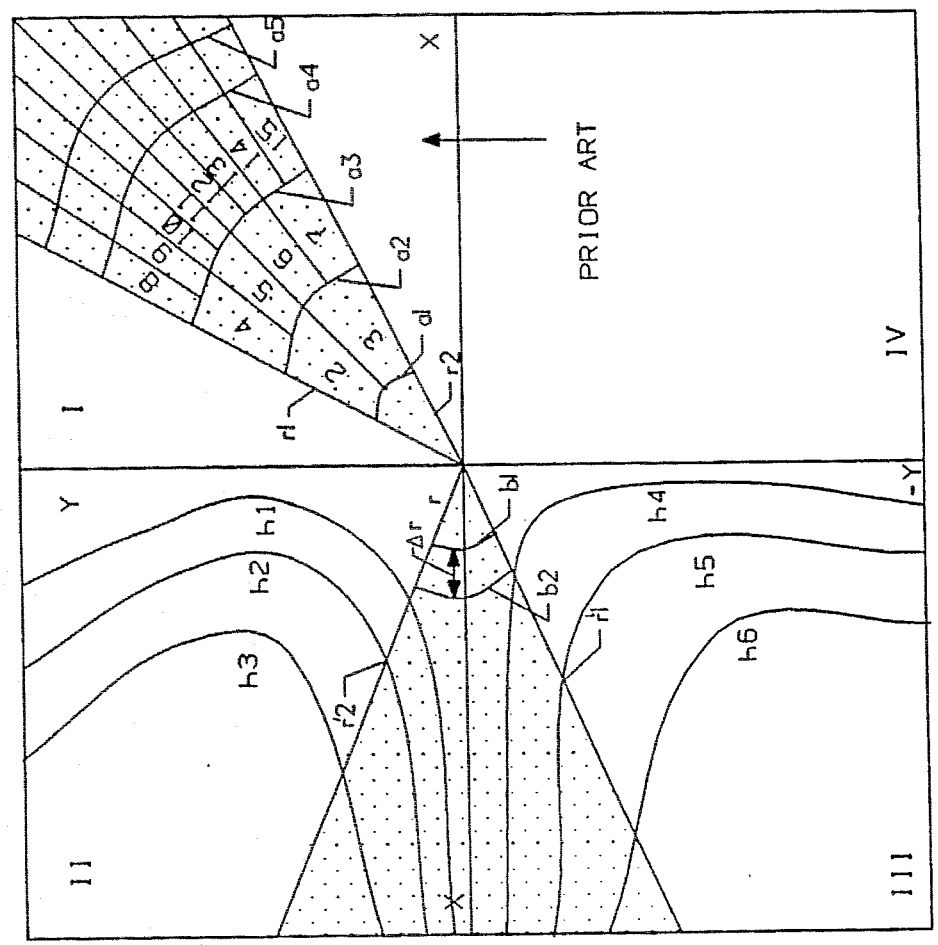
FIG. 1 is a graph which shows a multitude of pixels and is intended to illustrate the basic principles of the invention by reference to a prior art aggregate radial scan pattern in quadrant I and the hyperbolically-based resolution boundaries of the present invention in quadrants II and III.

In FIG. 1 the radial line segment ri which is labeled r in quadrant III is approximately of the same length as the radial $r_1$ and $r_2$ that run between the origin and the arc $a_1$ of quadrant I. The radial segment r thus swings an arc $b_1$ which includes approximately the same angle as that between radials r1 and r2. It is seen, therefore, that in the zone defined by the radial r'1 and r'2 the arc $b_1$, there are fewer pixels than there are in the zone 1 of quadrant I. In order to create a zone which encompasses approximately the same number of pixels as zone 1 of quadrant I, the radial segment r would have to be extended by a factor $\Delta r$ to create an area bound by the arcs b1 and b2. This conclusion is the same for radial lines drawn close to the +x axis or the +y axis, -y axis. Thus it is seen that the resolution of the display along an axis is less than it is along the 45°, 35°, 225° and 315° lines where the resolution is at a maximum. Therefore, in order to obtain approximately the same resolution along the axis as along the 45°, 135°, 225° and 315° radial lines, the resolution boundaries must vary so that the closer a radial line is to an axis, the farther the resolution zone will extend along the axis. The present invention divides the display area into resolution boundaries so that the same number of pixels are incorporated in each boundary area regardless of the position of the radial scan pattern. The hyperbolic curves $h_1$–$h_6$ shown in quadrants II and III illustrate resolution boundaries that accomplish this result.

Figure 2:
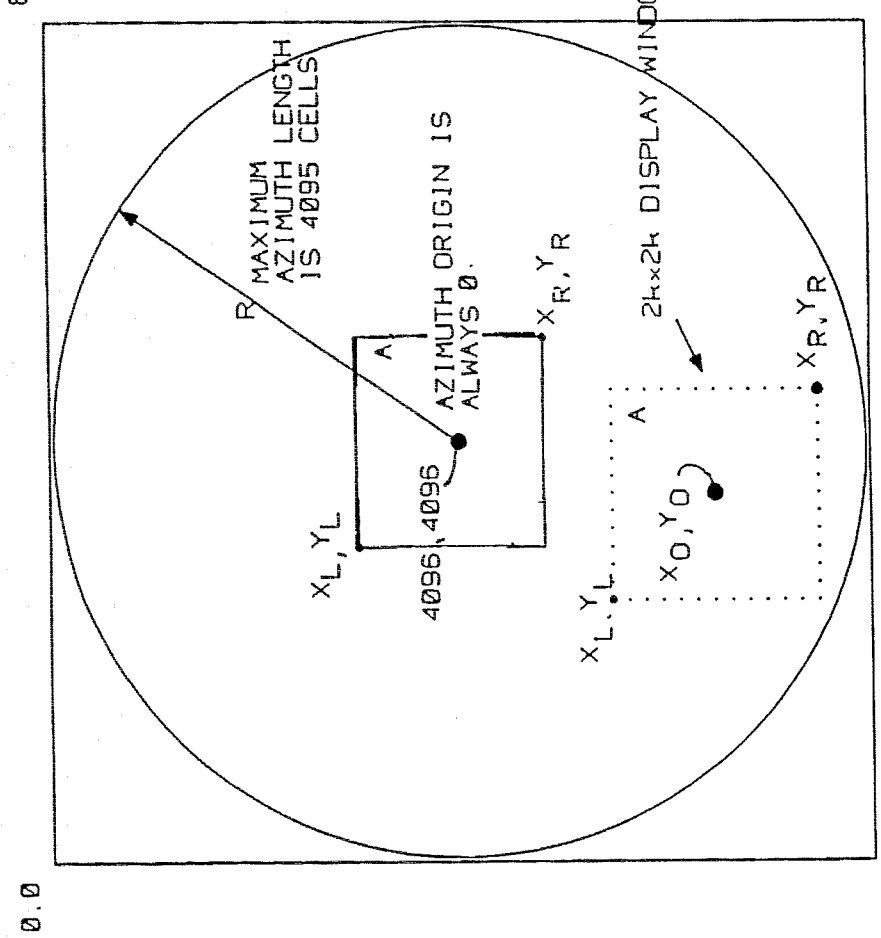
FIG. 2 is a map of a circular PPI logical display map on a rectangular x,y Cartesian coordinate logical screen map which also shows centered and offset physical display windows.
Figure 3:
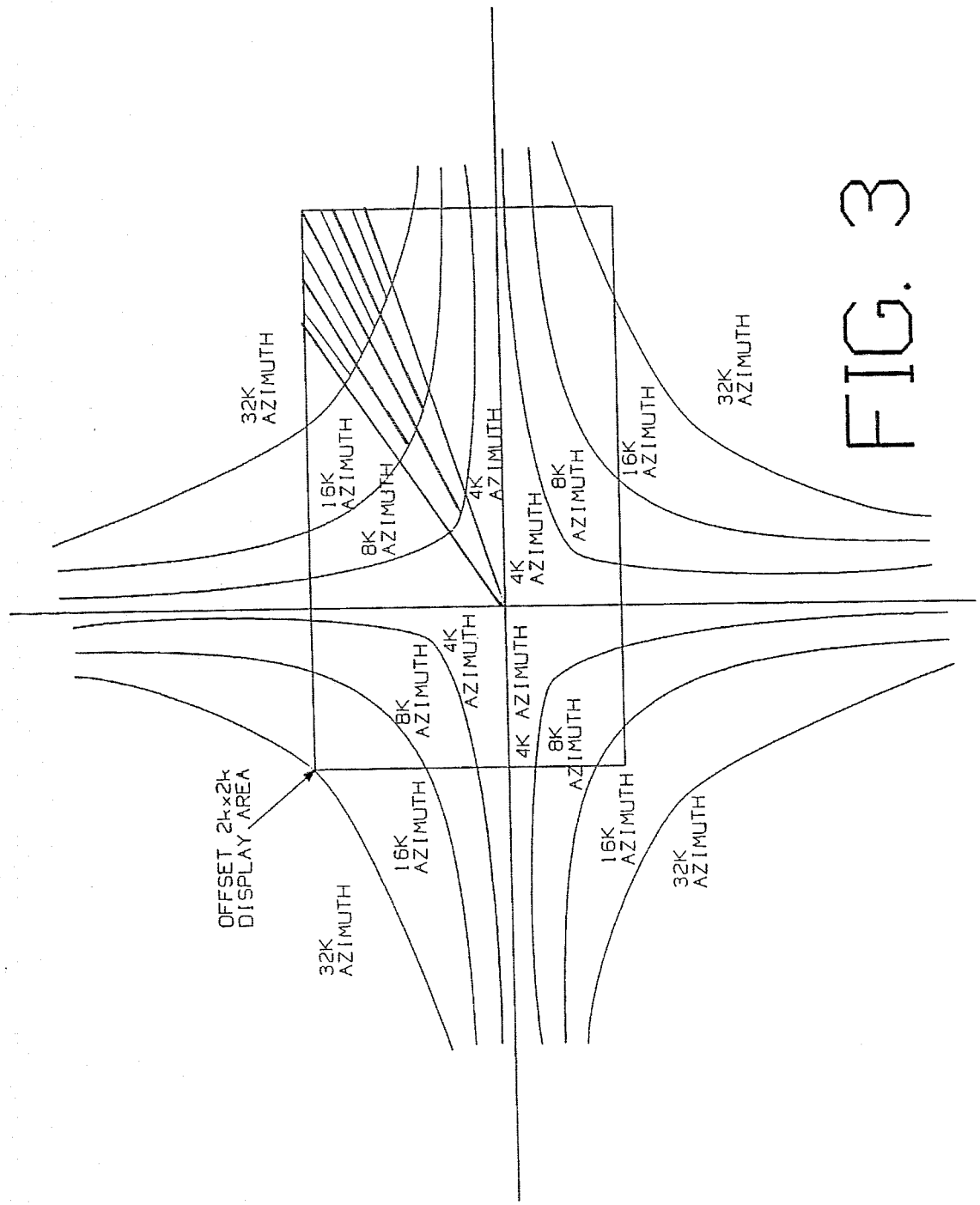
FIG. 3 is a diagrammatic showing of a physical offset window that is functioning in an offset mode which illustrates hyperbolically-based resolution boundaries and the associated aggregate radial scan pattern of the invention.

FIG. 2 represents a coordinate map of a logical display area which incorporates a circular PPI logical coordinate map and is defined by the logical corner coordinates (0,0), (8191,0), (0,8191) and (8191,8191). The four corners of the logical display area are defined by coordinate values that express the range of coordinate values that may be used to implement the physical display. This logical area does not represent physical display space, but is a map of the possible coordinate values that may be addressed to provide the physical display space. The center of the logical display area representation, which designates "0", is thus at 4096, 4096 so that the maximum length of a logical radial line, such as R of FIG. 2, of a circle drawn with the origin at this point is 4095 pixels. A physical display window A origin that contains 2K by 2K (4,164,304) pixels is shown in FIG. 2. The upper left-hand coordinate are $(x_L, y_L)$ and the lower right-hand coordinates are $(x_R, y_R)$. The coordinate values of the center of the window $(x_0, y_0)$ are thus within the addressable coordinate values of the logical display that range from 0 to 8191. The present invention is applicable to both the centered display or an offset display by adjusting the values of $(x_L, y_L)$, $(x_R, y_R)$ to any arbitrary location within the logical display area.

The manner in which the "break-points" or points on the resolution boundaries of the hyperbolically-based resolution ranges are established is determined by the equations (1), (2) and (3) below. In the zone closest to the origin which has a 4K resolution, pixel data is sent directly to the display. The equations (1) and (2) below represent the manner in which the 8K, 16K and 32K resolutions are defined. In equations (1), (2) and (3) below the values of $\theta+1$ and $\theta-1$ are stated in radians so that as the reference change pulse is incremented by 1, the angle $\theta$ will vary.

$$x_\theta = P_i \cos(\theta) \quad y_\theta = P_i \sin(\theta) \quad I=0, 1, \ldots N-1 \text{ and } \theta=0, 1, \ldots M-1 \quad (1)$$

where

N= maximum number of range bins (4096) and

M= maximum number of Azimuth Change Pulses (ACPs) per 360° rotation (32768)

$$x_\theta, y_\theta \notin \{(x_{1_{\theta-1}}, y_{1_{\theta-1}}), (x_{2_{\theta-1}}, y_{2_{\theta-1}}), \ldots (x_{N_{\theta-1}}, y_{N_{\theta-1}})\} \quad (2)$$

$$x_\theta, y_\theta \notin \{(x_{1_{\theta+1}}, y_{1_{\theta+1}}), (x_{2_{\theta+1}}, y_{2_{\theta+1}}), \ldots (x_{N_{\theta+1}}, y_{N_{\theta+1}})\} \quad (3)$$

Calculation of the "break points" of the resolution boundaries in the described embodiment from equations (2) and (3) proceeds as follows:

(1) All 4K resolution range break-points are determined when $\theta=0$ since the radar ACP rate is 4096.

(2) 8K break-points are generated when $\theta=1$ to 8192 where $\theta$ increments by 2.

(3) 16K break-points are generated when $\theta=1$ to 16384 where $\theta$ increments by 2.

(4) 32K break-points are generated when $\theta=1$ to 32768 where $\theta$ increments by 2.

(5) Higher resolution range break-points are generated when $\theta=1$ to the max azimuth resolution where $\theta$ increments by 2.

To generate break-points for cases 1–5 above:

(a) Sets $\theta_{-1}$ and $\theta_{+1}$ are computed.

(b) Then $x\theta$, $y\theta$ are computed for $1=0 \ldots N-1$. The first $x\theta$, $y\theta$ which is not an element of the sets $\theta-I$ and $\theta+1$ is the break-point location for a given $\theta$. The break-point $R_\theta$ is the value of I.

(c) The steps (a) and (b) are then repeated for $\theta=0 \ldots n-1$ for all vectors in the 360° sweep.

(d) When the maximum range break-point has been determined, all related $\Delta x$, $\Delta y$ and $R_\theta$ values are stored in a read-only-memory (ROM) look-up table.

Figure 4:
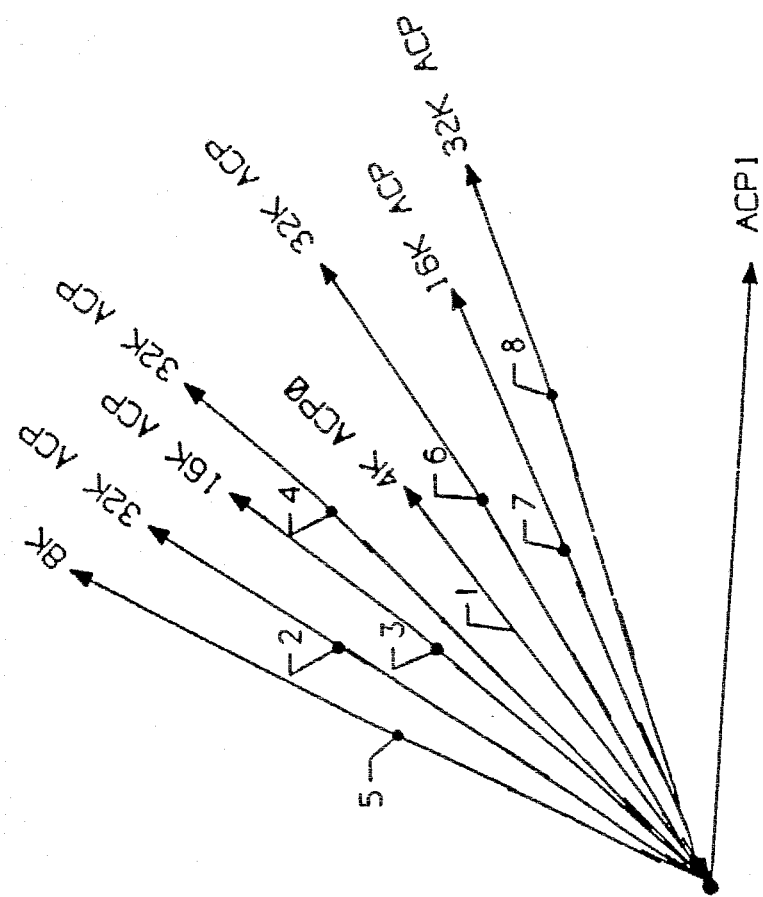
FIG. 4 is a diagrammatic showing of the generation of an aggregate radial scan pattern.

FIG. 4 shows the aggregate scan pattern that is generated by the described embodiment at a particular location on the screen. This showing is, of course, only illustrative of the generated aggregate radial scan pattern since the radials making up the pattern will actually be separated by angular spacing differences that are so small they can not be illustrated in the Figure. In the representative scan pattern of FIG. 4, the circled numbers 1 to 8 indicate the sequence in which the radial lines are produced by the described embodiment. For example, the 4K ACP resolution line 1 starts at the origin and extends to the edge of the display area. The 32K ACP resolution radial line 2, (i.e., the one that begins at the 32K resolution boundary and extends to the edge of the display area), is generated next. Then in sequence the 16K ACP resolution line 3, a second 32K ACP resolution line 4, the 8K ACP resolution line 5, a third 32K ACP resolution line 6, a second 16K ACP resolution line 7 and a fourth 32K ACP resolution line 8. The 4K ACP resolution line then moves from the ACP0 direction to the ACP1 direction and the aggregate scan pattern is regenerated as noted above.

FIG. 5 shows data pattern of the look-up table ROM that is used to generate the aggregate radial scan pattern of FIG. 4 in which all of the radial lines, except for the 4K resolution radial line, begin at break-points of the hyperbolically-based resolution boundaries, as defined by equations (2) and (3) above. In the look-up table ROM of FIG. 5, the left-most column stores addresses 0 to M−1, which correspond to the 32768 azimuths per 360°. The $\Delta x$ and $\Delta y$ values for each azimuth value are stored in the next two left-most columns of storage, and the radial break-point for each azimuth value is stored in the next right-most column of storage. The four check-mark columns to the right of the radial break-point storage column show the order in which the ROM addresses are accessed to generate the radial lines 1 to 8 of the aggregate radial scan pattern of FIG. 4. The rotation of the scan pattern clockwise is represented by the radials as the table is accessed in a downward direction at ACP0, ACP1, etc. The ROM may be read in either direction according to whether the scan pattern is rotating in a clockwise or a counter-clockwise direction. The hyperbolically-based resolution boundaries, (i.e., resolution boundaries that approximate mathematically exact hyperbolic curves), of the present invention are derived by the calculations set forth in the above equations (1), (2) and (3), which result in hyperbolic resolution boundaries that approximate true hyperbolic boundaries and which are readily implementable by software algorithms in a digital computer. The look-up table does not need to be recalculated when the display area of a centered display window is offset since the higher resolution zone areas will be expanded in the direction remote from the center of the offset display area, as required.

Figure 6:
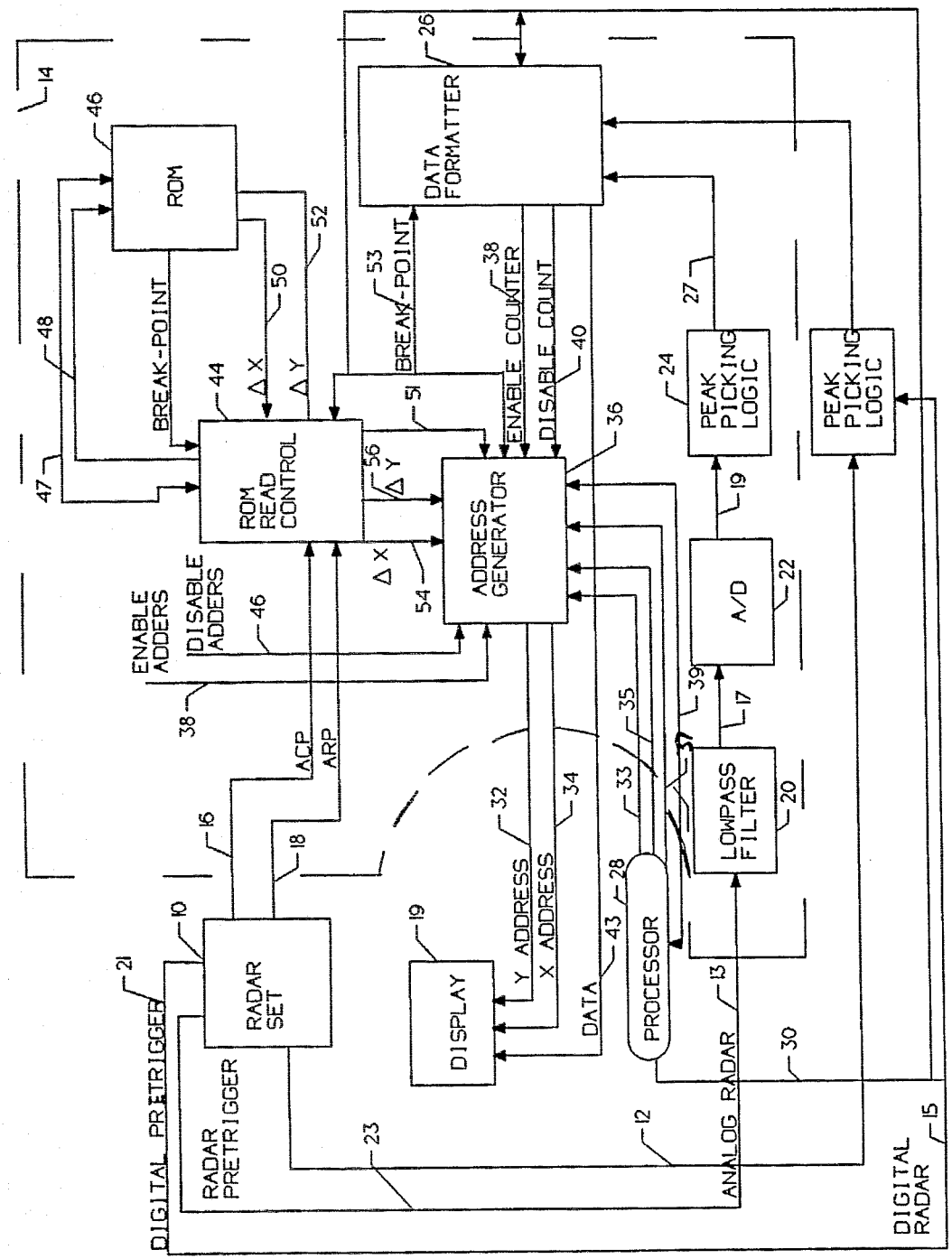
FIG. 6 is an overall block diagram of the portion of a radar system which incorporates the radar scan conversion technique of the invention.

The present invention may be implemented in software, but a hardware implementation utilizing digital signal processing techniques is preferred because of the large amount of coordinate data that must be taken into account in order to achieve the fast response speed for a high resolution scan converter. A system for implementing the present invention is illustrated by reference to the system block diagram of FIG. 6 in which the storage of data in the look-up table ROM memory 46 allows the radar scan converter to generate the aggregate radial scan pattern. In this manner the hyperbolically-based resolution boundaries are utilized to provide an improved Cartesian coordinate display without spoking across the entire display, including along the x and y coordinate axes. The system of FIG. 6 is representative of the radar scan converters which employ look-up tables. It is illustrative of a hardware implementation of the present invention, but other hardware and/or software implementations which utilize the present invention may be produced by those skilled in the art, in accordance with the function and purpose of the specific radar system.

In FIG. 6 a radar set 10 that is preferably capable of processing both digital, or beacon, and analog radar signals receives the radar signals from a radar antenna (not shown) and supplies radar signals on the line 12 to the lines 13, 15, where the analog and digital signals are separated and are respectively supplied to the radar scan converter 14. The analog signals are supplied to a lowpass filter 20 and the digital signals are applied directly to the digital peak-picking logic 25. Digital signals may be processed to display radar data on the display. The radar set also provides an azimuth change pulse (ACP) on the line 16 and an azimuth reference pulse (ARP) on the line 18 to the scan converter. The radar data from the radar set is representative of radar return signals with polar radial and azimuth data representations (r,θ). The ARP occurs once at the same point at each 360° reference point of the radar antenna to indicate the starting point, or 0° angle for each new sweep pattern. The ACP then occurs at predetermined time intervals of the sweep from the ARP at very small angular changes. For example, there may be as many as 6192 angular changes or ($\Delta \theta$), for each 360° sweep of the sweep pattern.

The lowpass filter 20 of the radar scan converter 14 that receives the analog radar data removes the second harmonic of the carrier frequency of the input analog signal and other higher frequency noise and unwanted signals. The analog signal is then fed from the lowpass filter to an analog-to-digital converter 22 which converts the analog signals to digital signals. A radar data peak picking logic 24 is desirably included. In the Thomas U.S. Pat. No. 4,469,185 it was noted that near the origin of the display, the azimuthal resolution of the radar is greater than the resolution of the display, and thus signal returns from adjacent radar pulses that are displayed near the origin can convert into the same x,y coordinates on the display screen. It is common, as stated in the Thomas patent, to use peak-to-puslse integration circuits, such as 24A, 25A to avoid losing signal samples near the origin so that new samples of a higher peak signal will be retained instead of older ones.

The digital pretrigger signal 66 and the radar pretrigger signal 67 reset the respective logic circuits to begin sampling the respective radar pulse returns. The digital pretrigger signal 66 is supplied by the radar and is equal to the pulse repetition frequency (PRF) of the digital radar transmission. The radar pretriger signal 67 is supplied by the radar and pretrigger signal 67 is supplied by the radar and is equal to the PRF of the analog radar.

The output of the peak picking logic 24 is supplied to a data formatter 26. The data formatter 26 is controlled by a data processor 28 for the purpose of providing the aggregate radial scan pattern on the display 19. The data formatter 26 and the processor 28 are coupled together over the bus 30. The processor 28 is located outside of the scan converter 14 and may operate in conjunction with the other components of the scan converter to provide for various functions that are commonly found in radar data processing systems, such as range scaling, pulse-to-pulse integration, scan-to-scan integration, control of the persistence of the screen, synthetic decay, apex removal, azimuth rotation, programmable gain and other features. The peak-picking logic elements 24,25 supply their output signals on the lines 27, 29 to the pulse-to-pulse compression logic and then to the data formatter.

The ROM read control 46 supplies an enable address control signal to the address generator 36 on the line 38 and a clear address control signal to the address generator on the line 40. The data formatter 26 supplies data signals to the display 42 on the lines 43, while the address generator supplies the final x and y addresses necessary to generate the aggregate radial scan pattern on the lines 32, 34. The ROM read controller 44 is coupled to the look-up table 46 and supplies the read signal to it over the line 48. The output of the look-up table 46 is supplied as $\Delta x$, $\Delta y$, and "break-point" signals on the lines 54, 56, respectively, which are sent to the address generator 36. Breakpoint data is sent to the address generator and to the data formatter on the lines 51, 53 to identify the hyperbolic or the hyperbolically-based resolution boundaries. Incrementation of the last address generated by the address generator provides new location points for the generation of the aggregate radial scan pattern. The ROM read controller 44 receives $\Delta x$ and $\Delta y$ signals on the lines 50, 52 from the ROM 46.

Figure 7:
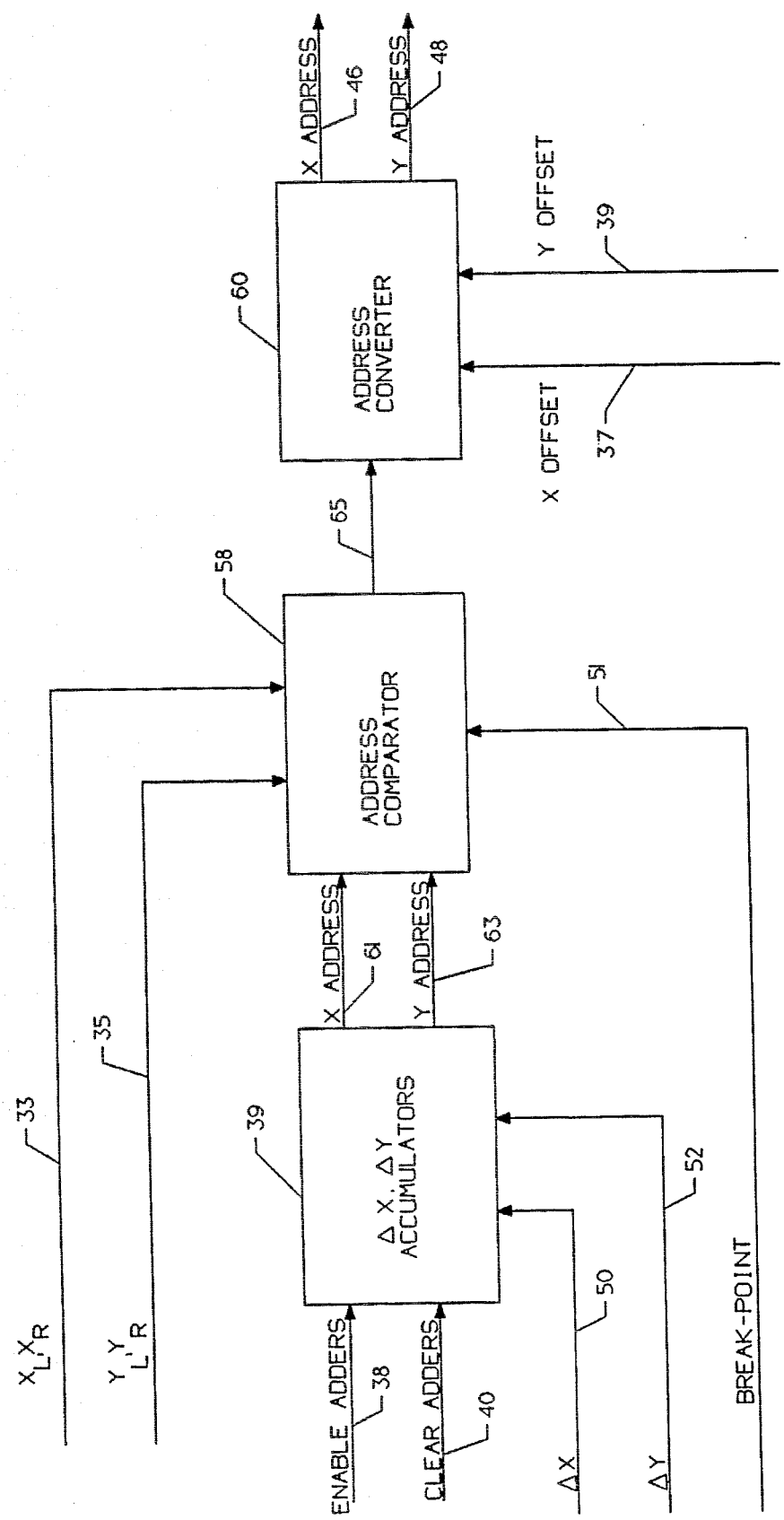
FIG. 7 is a block diagram of the address generator portion of the system of FIG. 6.

FIG. 7 is a block diagram which shows an implementation of the address generator 36 of FIG. 6 in greater detail. The logical display area is produced by the address generator 36 and includes $\Delta x$ and $\Delta y$ accumulators 39 which are enabled by the control signal on the line 38, and which are cleared by the signal on the clear line 40, both of which are sent by the data formatter 26. The physical display window A coordinate addresses $x_L, y_L$ and $x_R, y_R$ are supplied on the lines 33 and 35 to the address comparator 58, while the $\Delta x$ and $\Delta y$ adders add address increments to the previously accumulated x,y values in the accumulator 39 until the 4096 range bins of a sweep have been produced in order to generate the accumulated updated x,y addresses. The accumulators for generating radials of the aggregate scan pattern are then cleared again so as to accommodate 4096 values of $\Delta x$ and $\Delta y$ for the logical display area. The x address and the y address on the lines 61, 63 represent the logical display area in which radial generation occurs.

The output of the address comparator 58 is supplied on the line 65 to the address converter 60. The address comparator 58 determines if the x,y values lie within the display window A and if the break-point for a resolution boundary has been exceeded. If the break-point has been exceeded so that the address falls into in the next higher resolution area, the associated x,y values are passed to the address converter 60 in order to be mapped to the physical display area. The physical display window is positioned on the high resolution display x offset and y offset address signal on the lines 37, 39 from the processor 28.

We claim:

1. A process for providing radar scan conversion from radar data in polar coordinates to radar data in rectangular coordinates by a digital computer which receives $(r, \theta)$ coordinate data from a radar receiver and which supplies (x,y) coordinate data to a display, wherein said display has a variable azimuthal pixel resolution that increases from the center of the display to the periphery of the display comprising:

defining a plurality of zones of said display which have increasing azimuthal resolution values as said zones extend outwardly from the center of said display towards the periphery of said display and are bound by boundaries that approximate mathematically correct hyperbolic curves, and generating an aggregate radial scan pattern on said display that consists of a plurality of radials each of which have lengths that traverse one or more of said zones, and the number of radials that traverse said zones match the average azimuthal resolution of each of said zones.

2. A process as claimed in claim 1 wherein the number of radials that traverse zones from the outermost zone to the center of said display is such that each zone is traversed by twice as many radials as the next innermost neighboring zone.

3. A radar scan conversion system for radar signal scan conversion of radar data based upon polar $(r, \theta)$ coordinates to radar data based upon rectangular (x,y) coordinates comprising a radar scan converter means and a display means wherein said radar scan converter supplies said rectangular (x,y) coordinate data to said display means for controlling (x,y) defined pixels of said display means, comprising:

addressable look-up table storage means for storing data representative of a plurality of zones of said display which have increasing azimuthal values as said zones extend outwardly from the center of said display towards the periphery of said display, and are bound by boundaries that approximate mathematically correct hyperbolic curves, generating means that addresses said look-up table storage means that selectively obtains said stored data from said look-up table storage means and generates an aggregate radial scan pattern on said display that consists of a plurality of radials each of which have lengths that traverse one or more of said zones wherein the number of radials that traverse said zones match the average azimuthal resolution of each of said zones.

4. A radar scan conversion system as claimed in claim 3 wherein said generating means generates a number of radials that traverse zone from the outermost zone to the center of said display such that each zone is traversed by twice as many radials as the next innermost neighboring zone.

* * * * *

UNITED STATES PATENT AND TRADEMARK OFFICE
CERTIFICATE OF CORRECTION

PATENT NO. : 5,554,992
DATED     : September 10, 1996
INVENTOR(S) : Joe M. Toth, Kenneth E. Nuedorf It is certified that error appears in the above-indentified patent and that said Letters Patent is hereby corrected as shown below:

Column 6 line 6, change "4,164,304" to -- 4,184,304 -- .

Column 8 line 18, change "6192" to -- 8192 -- .

Signed and Sealed this

Twenty-second Day of April, 1997

Attest:

BRUCE LEHMAN

Attesting Officer

Commissioner of Patents and Trademarks